US012785406B2

(12) United States Patent
Luu et al.

(10) Patent No.: US 12,785,406 B2
(45) Date of Patent: Nov. 3, 2026

(54) GENERATOR SYSTEM WITH AUTOMATIC POWER CONTROL

(71) Applicant: Generac Power Systems, Inc., Waukesha, WI (US)

(72) Inventors: Tin Luu, Milwaukee, WI (US); Robert Ricciardelli, Jr., Waukesha, WI (US); Teresa Nash, Waukesha, WI (US); Matthew Ellis, Waukesha, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 0 days.

(21) Appl. No.: 18/741,661

(22) Filed: Jun. 12, 2024

(65) Prior Publication Data

US 2024/0413643 A1 Dec. 12, 2024

Related U.S. Application Data

(63) Continuation of application No. 17/932,852, filed on Sep. 16, 2022, now Pat. No. 12,040,622.

(60) Provisional application No. 63/245,641, filed on Sep. 17, 2021.

(51) Int. Cl.

| | |
|---|---|
| ***H02J 1/00*** | (2026.01) |
| ***H02J 3/38*** | (2006.01) |
| ***H02M 7/219*** | (2006.01) |

(52) U.S. Cl.

CPC ............. *H02J 3/381* (2013.01); *H02M 7/219* (2013.01)

(58) Field of Classification Search

CPC .................................. H02J 3/38; H02M 7/219

See application file for complete search history.

(56) References Cited

U.S. PATENT DOCUMENTS

| | | | | |
|---|---|---|---|---|
| 6,198,176 B1 * | 3/2001 | Gillette | H02J 9/08 307/64 |
| 8,008,808 B2 * | 8/2011 | Seeker | H02J 3/381 307/72 |
| 9,148,016 B2 | 9/2015 | Kaufman et al. | |
| 9,559,607 B1 | 1/2017 | Wang et al. | |
| 11,757,361 B2 | 9/2023 | Somani et al. | |
| 2003/0111842 A1 | 6/2003 | Gilbreth et al. | |
| 2004/0020206 A1 * | 2/2004 | Sullivan | F01C 11/00 60/670 |
| 2006/0017328 A1 | 1/2006 | Bryde | |

(Continued)

FOREIGN PATENT DOCUMENTS

| | | |
|---|---|---|
| CN | 106803670 B | 7/2019 |
| CN | 111082413 A | 4/2020 |

OTHER PUBLICATIONS

PCT International Searching Authority, International Search Report and Written Opinion for application No. PCT/US2022/076587 mailed Jan. 23, 2023, 12 pages.

*Primary Examiner* — Ryan Johnson
*Assistant Examiner* — Esayas G Yeshaw
(74) *Attorney, Agent, or Firm* — Merchant & Gould P.C.

(57) ABSTRACT

This disclosure is directed to generator systems and methods for monitoring a direct current bus and automatically operating in response to a power level of the direct current bus dropping below a desired power level or to a threshold before dropping below the power level. The automatic operation of the generator system may raise or keep the actual power level of the system above the desired power level or threshold.

22 Claims, 9 Drawing Sheets

(56) References Cited

U.S. PATENT DOCUMENTS

| | | | | |
|---|---|---|---|---|
| 2007/0272548 | A1* | 11/2007 | Sutherland | F02M 21/0227 205/349 |
| 2007/0287042 | A1* | 12/2007 | Rainville | H01M 8/04955 429/444 |
| 2010/0106389 | A1* | 4/2010 | Fore | F02D 29/06 701/102 |
| 2011/0215640 | A1* | 9/2011 | Donnelly | H02J 3/466 307/21 |
| 2016/0308361 | A1 | 10/2016 | Zhao et al. | |
| 2018/0219410 | A1* | 8/2018 | Harris | H02J 9/04 |
| 2019/0280583 | A1* | 9/2019 | Nagafuchi | H02K 47/04 |
| 2021/0344203 | A1 | 11/2021 | Sakamoto et al. | |

* cited by examiner

FIG. 5
DC Breaker 322
Power Source 320
Heatsink 414
Boost Converter System 404
Powerline Communicator 412
Converter System Controller 410
Rectifier 402
Sensor 406
Power Supply 408
302
Alternator 308

GENERATOR SYSTEM WITH AUTOMATIC POWER CONTROL

CROSS REFERENCE TO RELATED APPLICATIONS

This application is a continuation of U.S. application Ser. No. 17/932,852, filed on Sep. 16, 2022, which claims priority to U.S. Provisional Application No. 63/245,641, filed on Sep. 17, 2021, both of which are entitled GENERATOR SYSTEM WITH AUTOMATIC POWER CONTROL, and the disclosures of which are hereby incorporated by reference in their entireties. To the extent appropriate, a claim of priority is made to each of the above-disclosed applications.

TECHNICAL FIELD

This disclosure relates to generator systems and, in particular, to direct current generator systems.

BACKGROUND

Engine-driven electrical generators are used in a wide variety of applications. The engine consumes fuel when operating to produce and supply the electricity. The generator may be used to supply electricity during events where electricity cannot be received from other sources such as from an electric grid. The electric grid is an interconnected network for the delivery of electricity from producers to consumers. For example, a utility supplies electricity from the utility generation sources to the consumers connected to the grid. A generator can be used to produce electricity when other sources of electricity are not able to supply sufficient power, such as when an electric grid experiences a power outage. However, many generators must be manually turned on by the user to produce electricity or automatically turn on only when an outage occurs. Therefore, the generator may not begin producing electricity and/or may not address power quality issues such as low voltage until the outage occurs. Additionally, the generator may need to be turned off manually. Thus, when other sources of electricity become available, the generator may needlessly operate and waste fuel and/or contribute to overloading the electrical systems the generator is supplying power to.

Consumers connected to the electric grid may own or be connected to a microgrid. A microgrid is an independent energy system that serves a specific area. A microgrid normally operates connected to the electric grid, but the microgrid may be able to disconnect from the electric grid and function autonomously. A microgrid can be a direct current (DC) grid that maintains a direct current bus for the flow of electricity. A DC microgrid can directly connect to DC sources and may indirectly connect to alternating current (AC) sources such as via a converter. DC microgrids can include DC power generation sources such as photovoltaic generators (e.g., solar panels), wind turbines, and water turbines. A DC microgrid can additionally include DC power storage systems such as batteries.

Maintaining a reliable and stable level of power in DC microgrids can be difficult due to the intermitted generation of power by the power generation sources connected to the grid and/or when the electric grid the microgrid is connected to experiences issues. For example, a solar panel produces energy only when sunlight reaches the panel, and a wind turbine only produces energy when there is wind in the area. If the power is not kept at a stable and reliable level, the DC microgrid may not be able to power systems connected to the microgrid, the microgrid may experience an overload that would shut the microgrid down and/or damage the microgrid and systems connected to the microgrid, or excessively wear out parts of the microgrid. Therefore, a solution that maintains a reliable and stable level of power in the DC microgrid is needed.

SUMMARY

In general, the present disclosure relates to a generator system.

One aspect is a method for operating a generator comprising determining a desired voltage of a direct current bus; determining an actual voltage of the direct current bus; when the actual voltage is lower than the desired voltage, causing a generator to produce electricity to raise the actual voltage; and when the actual voltage is higher than the desired voltage, causing the generator to cease producing electricity.

Another aspect is a direct current microgrid system comprising: a direct current bus operable to conduct electricity; and a generator system operable to produce electricity comprising: an engine operable to consume fuel to generate mechanical energy; an alternator operable to convert the mechanical energy generated by the engine to electricity; a converter system operable to: convert alternating current electricity to direct current electricity; step up a voltage of the electricity generated by the alternator; step down a current of the electricity generated by the alternator; and a generator system controller operable to control the generator based on an actual voltage of the direct current bus and a desired voltage of the direct current bus.

A third aspect is a non-transitory computer readable medium having stored thereon software instructions that, when executed by a processor, cause the processor to: determine a desired voltage of a direct current bus; determine an actual voltage of the direct current bus; when the actual voltage is lower than the desired voltage, cause a generator to produce electricity to raise the actual voltage; and when the actual voltage is higher than the desired voltage, cause the generator to cease producing electricity.

BRIEF DESCRIPTION OF THE DRAWINGS

The following drawings are illustrative of particular examples of the present disclosure and therefore do not limit the scope of the present disclosure. The drawings are not necessarily to scale and are intended for use in conjunction with the explanations in the following detailed description. Examples of the present disclosure will hereinafter be described in conjunction with the appended drawings, wherein like numerals denote like elements.

DETAILED DESCRIPTION

Figure 1:
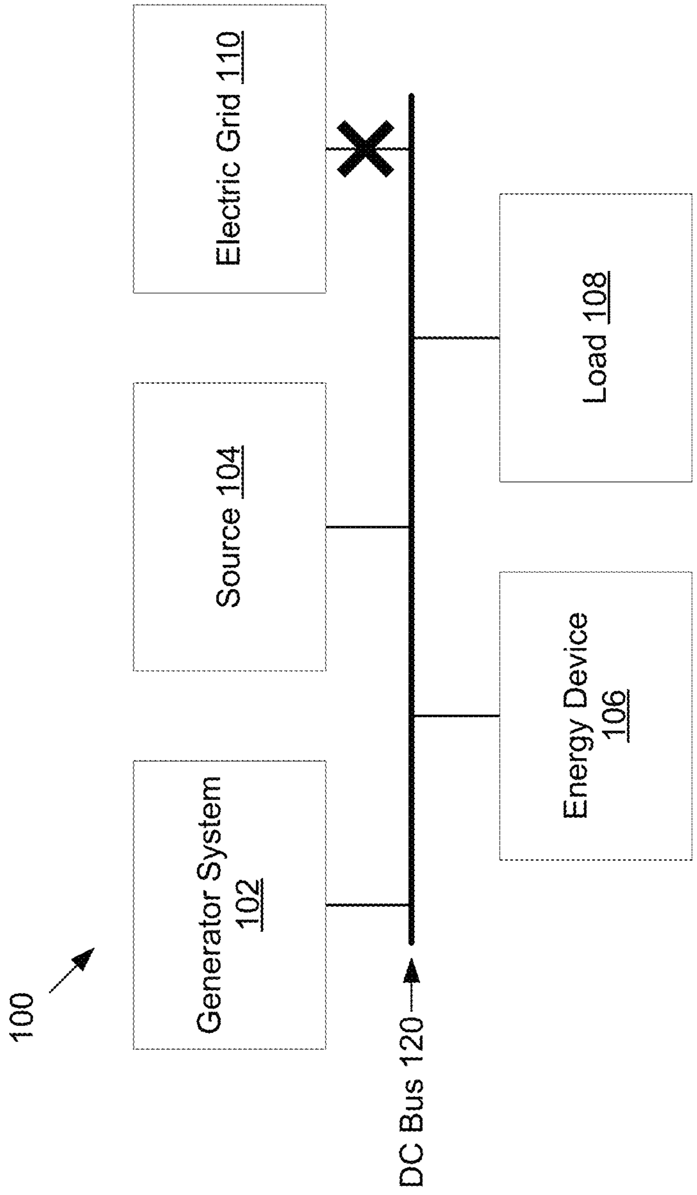
FIG. 1 is a block diagram of a direct current microgrid system according to examples.

Various examples of the present disclosure will be described in detail with reference to the drawings, wherein like reference numerals represent like parts and assemblies throughout the several views. Reference to various examples does not limit the scope of the disclosure, which is limited only by the scope of the claims attached hereto. Additionally, any examples set forth in this specification are not intended to be limiting and merely set forth some of the many possible examples for the claimed disclosure.

As briefly described above, examples of the present disclosure are directed to a generator system. In one example, the generator is a DC generator. In some embodiments, the DC generator is capable of being connected to a variable voltage direct current (DC) bus, such as a DC microgrid. In some embodiments the DC generator is capable of operating in parallel with other DC sources or loads. Further, in some embodiments the DC generator operates on the principle of Voltage Controlled Power Regulation (VCPR). For example, when the DC bus voltage droops, the generator can supply power to the bus. In some configurations, when the DC bus voltage increases, the DC generator linearly reduces power production with increasing bus voltage until a maximum bus voltage is reached, at which time the DC generator power production stops.

In some embodiments, the generator system can automatically operate in response to a power level such as a voltage level of a system the generator system is connected to. For example, the generator system may be connected to a DC bus that supplies and/or receives power from loads, sources, energy devices, electric grids, and other systems that supply and/or receive power. A DC bus will be referred to herein. In some embodiments the DC bus is a system that includes a conductor that one or more systems can connect to and receive and/or supply power.

An example generator system described herein improves the overall functionality of the generator system relative to conventional generators. As described further herein, some embodiments of the generator system may automatically maintain the voltage of a system connected to the generator system. The desired voltage and/or other parameters controlling the generator system may be received via powerline communications through a conductor, such as a powerline, of the system connected to the generator system and/or another system connected to the system the generator is connected to. For example, the generator system may be connected to a microgrid, and the microgrid may also be connected to an electric grid. In some embodiments, the generator system may receive the desired voltage and/or other parameters via powerline communication from a system connected to the microgrid and/or from a system connected to the electric grid. Some embodiments of the generator system may also monitor the operation of the generator system itself and/or the microgrid the generator system is connected to. For example, the generator system may send a data package including monitor and control data via powerline communication to a system connected to the microgrid and/or a system connected to the electric grid.

Additionally, the generator system may be used in place of other sources of power, such as an electric grid, when desired. For example, the generator system may automatically charge batteries connected to the microgrid when the battery level drops below a certain point. This may be a result of the generator system monitoring the voltage of the DC bus, caused by the generator system monitoring the charge level of the batteries directly, and/or caused by receiving a powerline communication. For example, automatically charging the batteries may be a result of the generator system monitoring the voltage of the DC bus because the batteries may not charge when the actual voltage of the DC bus is below a desired voltage. Therefore, when the generator system produces power to raise the voltage to the desired voltage, the batteries may begin charging.

FIG. 1 is a block diagram of an example direct current (DC) microgrid system 100. In this example, the DC microgrid system 100 includes a generator system 102, a source 104, an energy device 106, a load 108, and an electric grid 110, all connected to a DC bus 120. While one generator system 102, source 104, energy device 106, load 108, and electric grid 110 are shown in this example, any number of systems and devices can connect to the DC bus 120.

The DC bus 120 may be a conductor that allows the systems connected to the DC bus 120 to supply and/or receive electricity. Systems may connect directly or indirectly to the DC bus 120. For example, a system that supplies and/or receives DC power may directly connect to the DC bus 120, while a system that supplies and/or receives alternating current (AC) power may need to indirectly connect to the DC bus 120. The DC bus 120 may not operate correctly if AC power is supplied to the DC bus 120, and a system that supplies and/or receives AC power may not operate correctly if the system receives DC power from the DC bus 120. Therefore, the systems that supply and/or receive AC power may need to indirectly connect to the bus such as via an AC/DC converter that can convert AC power supplied to the converter to DC power and/or convert DC power supplied to the converter to AC power. Systems that connect directly to the DC bus 120 may experience less power loss because the systems do not have to utilize converters to indirectly connect to the DC bus 120. Power loss occurs when converters convert power.

The DC bus 120 may operate at a desired or otherwise optimal voltage. For example, the optimal voltage of the DC bus 120 may be 300 volts (V). In examples, the DC bus 120 includes two conductor rails. When two conductor rails are used in the DC bus 120, each rail may be capable of having varying voltages up to +/−220 V. One rail may be a positive voltage rail and one rail may be a negative voltage rail. This may allow the rails to have lower voltage individual voltages relative to ground while achieving a high transmission voltage for efficient power transmission. For example, the first rail may have 190 V and the second rail may have −190 V, resulting in a 380 V transmission on the DC bus 120.

The generator system 102 may consume fuel to generate electricity. When the generator system 102 operates, the generated electricity may be supplied to the DC bus 120 to raise the voltage of the DC bus 120. The generator system 102 may automatically operate to generate electricity when the DC bus 120 does not have a sufficient voltage and automatically cease operating when the DC bus 120 does have a sufficient voltage. In examples, the generator system 102 generates DC power, so the generator 102 can connect directly to the DC bus 120. The generator system 102 will be described in more detail herein.

The source 104 may supply electricity that may be received by other systems connected to the DC bus 120. For example, the source may be a solar panel system, a wind turbine system, a water turbine system, or any other system that generates electricity to be supplied to the DC bus 120. Each system may generate power intermittently based on various conditions. For example, a solar panel system may generate electricity when the solar panel(s) of the system receive sunlight and may not produce electricity when the panel(s) do not receive sunlight. Additionally, the solar panel system may not produce as much energy if the sunlight is not directly reaching the solar panels at the appropriate angle. Other systems such as the wind turbine system and water turbine system may generate power based on the presence of wind and water respectively. The DC bus 120 may include multiple sources 104 that generate power based on different conditions. Therefore, the multiple sources 104 may all generate power, none may generate power, or a subset of the sources 104 may generate power at different periods of time.

Because the source 104 may generate electricity intermittently, the DC bus 120 may receive an inconsistent supply of power. This intermittent power generation may cause the voltage of the DC bus to raise and lower as the level of power generation by the source 104 changes. When the source 104 is not producing energy and/or suddenly drops the level of energy produced, the generator system 102 may automatically operate to supply power to the DC bus 120 to keep the voltage on the DC bus 120 stable and/or above a desired voltage. When the source 104 is producing energy and/or suddenly raises the level of energy produced, the generator system 102 may automatically operate at a lower percentage of the generator system's 102 rated power level or cease producing power to keep the voltage on the DC bus 120 stable and/or above a desired voltage.

In some examples, the source 104 supplies DC power, so the source 104 may directly connect to the DC bus 120. In other examples the source 104 supplies AC power, so the source 104 must indirectly connect to the DC bus 120.

The energy device 106 is a system that is capable of both supplying and receiving power from the DC bus 120. For example, the energy device may be a battery that is capable or receiving energy for storage and supplying stored energy to the DC bus 120. In some examples, the energy device is capable of generating power to be supplied to the DC bus 120. In other examples, the energy device is not capable of generating power and only supplies power that was previously received. The energy device 106 may supply and/or receive power from the DC bus 120 intermittently, and the generator system 102 may operate to keep the voltage of the DC bus 120 stable while the energy device 106 supplies and/or receives power. In some examples, multiple energy devices 106 are connected to the DC bus 120 and supply and/or receive power at different periods of time similar to the multiple sources 104 that supply power as described above. The generator system 102 can operate to keep the voltage of the DC bus 120 stable while the multiple energy devices 106 supply and/or receive power.

In some examples, the energy device 106 supplies and receives DC power, so the energy device can directly connect to the DC bus 120. In other examples the energy device 106 supplies and receives AC power, so the energy device 106 must indirectly connect to the DC bus 120.

The load 108 may receive power via the DC bus 120. For example, the load may be a computer, an appliance such as a dishwasher or a refrigerator, a light, a fan, and any other system that receives power. The load 108 may receive power from the DC bus 120 intermittently, and the generator system 102 may operate to keep the voltage of the DC bus 120 stable while the load 108 receives power. In some examples, multiple loads, such as the load 108, may be connected to the DC bus 120 and receive power at different periods of time, similar to the multiple sources 104 that supply power as described above. The generator system 102 may operate to keep the voltage of the DC bus 120 stable while the multiple loads, such as the load 108, receive power.

In some examples, the load 108 receives DC power, so the load 108 can directly connect to the DC bus 120. In other examples the load 108 receives AC power, so the load 108 must indirectly connect to the DC bus 120.

The electric grid 110 is an interconnected network for electricity delivery that the DC microgrid system 100 is connected to. For example, the electric grid 110 is operated by utilities to supply power to multiple consumers including the DC microgrid system 100. The electric grid 110 typically supplies and receives AC power, so the electric grid 110 indirectly connects to the DC bus 120. In some examples, the DC microgrid system is isolated from the electric grid 110, and the electric grid 110 is not connected to the DC bus 120.

The electric grid 110 may experience events that interrupt the supply of power and/or affect the quality of the power that the electric grid 110 supplies such as power outages, overloading of the electric grid, generation issues, and other events. When the electric grid 110 operates inconsistently or otherwise incorrectly, the voltage on the DC bus 120 may be affected. The generator system 102 may automatically operate to supply power or cease supplying power to the DC bus 120 so the voltage of the DC bus 120 is stable and/or stays above a desired voltage.

Figure 2:
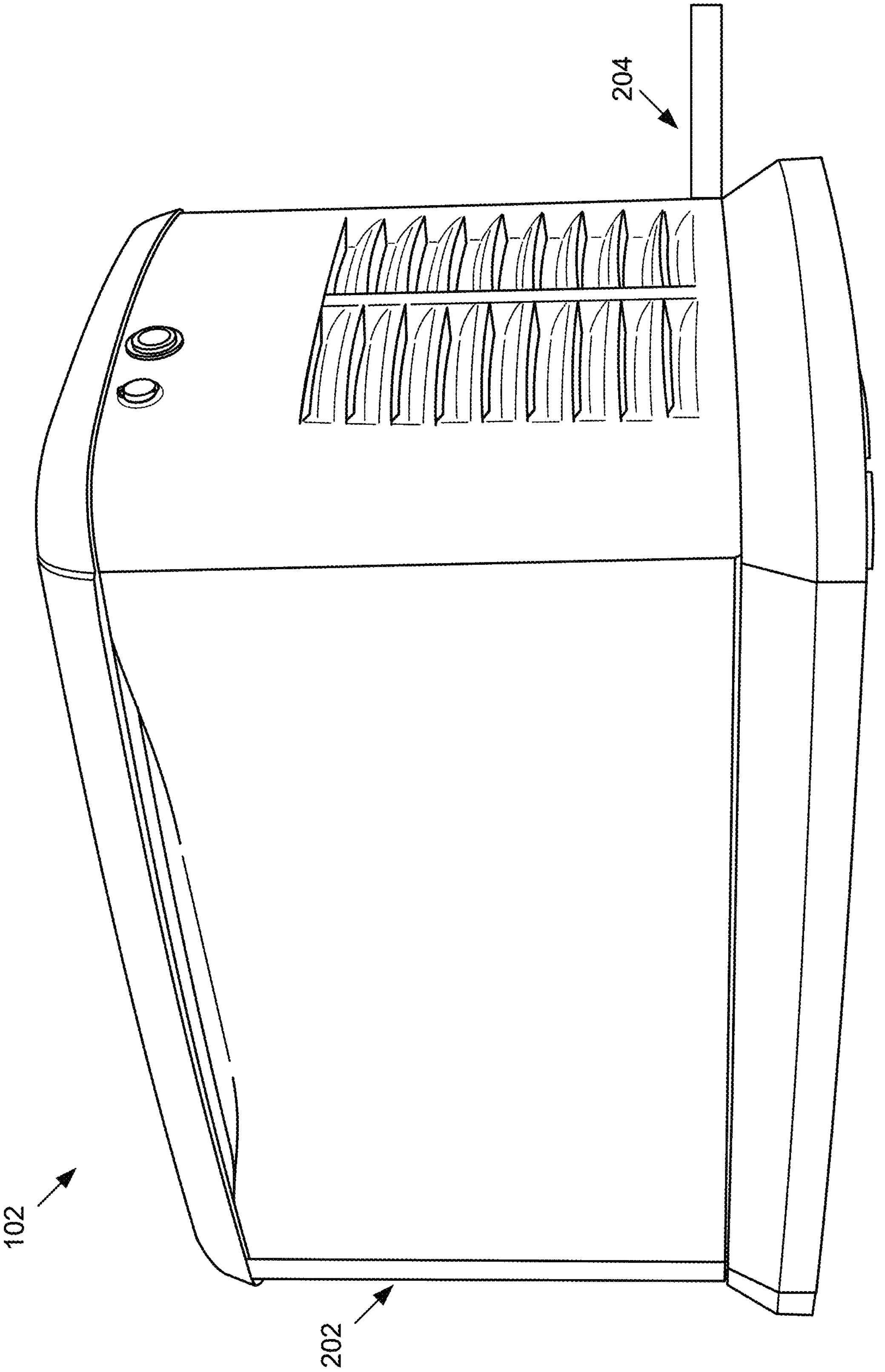
FIG. 2 is an illustration of a generator system according to examples.

FIG. 2 is an illustration of a generator system 102 according to examples. The generator system 102 includes a generator housing 202 that contains the components of the generator system 102. The components of the generator system 102 will be described in more detail herein with respect to FIGS. 3-6. The generator system 102 also includes a connection 204. The connection 204 may connect the generator system 102 to the DC bus 120 illustrated in FIG. 1. In some examples, the generator system 102 produces DC power, so the connection 204 directly connects the generator system 102 to the DC bus 120. For example, the connection 204 is a conductor that allows the generator to supply power to the DC bus 120. In other examples, the generator system 102 produces AC power, so the connection 204 indirectly connects the generator system 102 to the DC bus 120 such as via an AC/DC converter.

Figure 3:
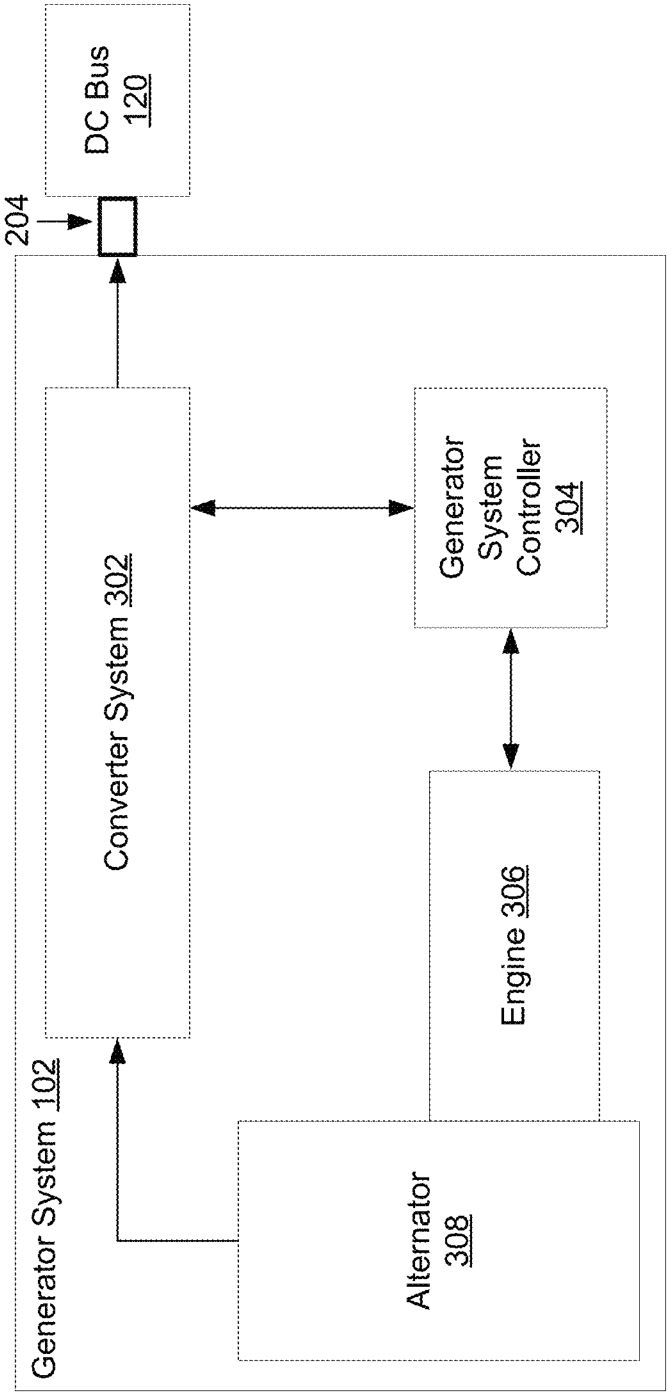
FIG. 3 is a block diagram of a generator system according to examples.

FIG. 3. is a block diagram of a generator system 102 according to examples. In this example, the generator system 102 includes a converter system 302, a generator system controller 304, an engine 306, and an alternator 308. The connection 204 connecting the generator system 102 to the DC bus 120 is also shown.

The generator system controller 304 may control the converter system 302, engine 306, and alternator 308. In examples, the generator system controller 304 is a computer. The generator system controller 304 can control the operation of the generator system 102 to cause the generator system 102 to produce electricity to be supplied to the DC bus 120 via connector 204. For example, the generator system controller 304 can monitor the actual voltage of the DC bus 120. If the generator system controller 304 determines that the actual voltage of the DC bus 120 is below the desired voltage of the DC bus 120, the generator system controller 304 may cause the engine 306, alternator 308, and converter system 302 to operate to supply power to the DC bus 120 to raise the voltage of the DC bus 120.

If the generator system controller 304 determines that the actual voltage of the DC bus 120 is equal to the desired voltage or within a threshold range of the desired voltage of the DC bus 120, the generator system controller 304 may cause the generator system 102 to stop producing power to be supplied to the generator. In other examples, the generator system controller 304 may determine a percentage of the rated power that may keep the actual voltage of the DC bus 120 equal to the desired voltage or within the range of the desired voltage of the DC bus 120 and cause the generator system 102 to operate at the determined percentage.

The generator system controller 304 can cause the generator system 102 to operate at the maximum percentage of the rated power capability the generator system 102 can produce or to operate at a percentage below the maximum rated power based on the magnitude of the difference between the actual voltage and the desired voltage of the DC bus 120.

The generator system controller 304 may receive, via powerline communication, the desired voltage and other parameters such as the threshold range or the percentage of rated power the generator system 102 should operate at for which magnitude of the difference between the actual voltage and the desired voltage of the DC bus 120. For example, the generator system controller 304 receives a powerline communication via connection 204 from a system connected to the DC bus 120 or a system connected to electric grid 110 illustrated in FIG. 1.

The engine 306 is an engine that consumes fuel to produce mechanical energy. For example, the engine consumes a fuel such as diesel or propane and produces mechanical energy such as by causing a motor to spin. The engine 306 may be any type of system that produces mechanical energy.

The alternator 308 is an electrical generator that converts mechanical energy to electricity. For example, the alternator 308 consumes or otherwise uses the mechanical energy generated by engine 306 to produce electricity. In examples, the engine 306 spins a motor, and the alternator 308 generates electricity by using the mechanical energy generated by the engine 306 to spin rotor such as a magnetic core between one or more conductors to produce a current. In some examples, the alternator 308 produces AC power. In other examples, the alternator 308 produces DC power.

The converter system 302 converts the electricity generated by the alternator to be ready for use. For example, the converter system 302 may convert AC power received from the alternator 308 to DC power, boost the voltage of the power, sense the voltage and/or current of the power that may be output to the DC bus for monitoring, and/or receive a powerline communication. In examples, the converter system 302 boosts the voltage of the power to match the desired voltage of the DC bus 120. In other examples, the converter system 302 boosts the voltage to a voltage higher than the actual voltage of the DC bus 120 to raise the actual voltage. The converter system 302 will be discussed in further detail herein with respect to FIG. 5.

Figure 4:
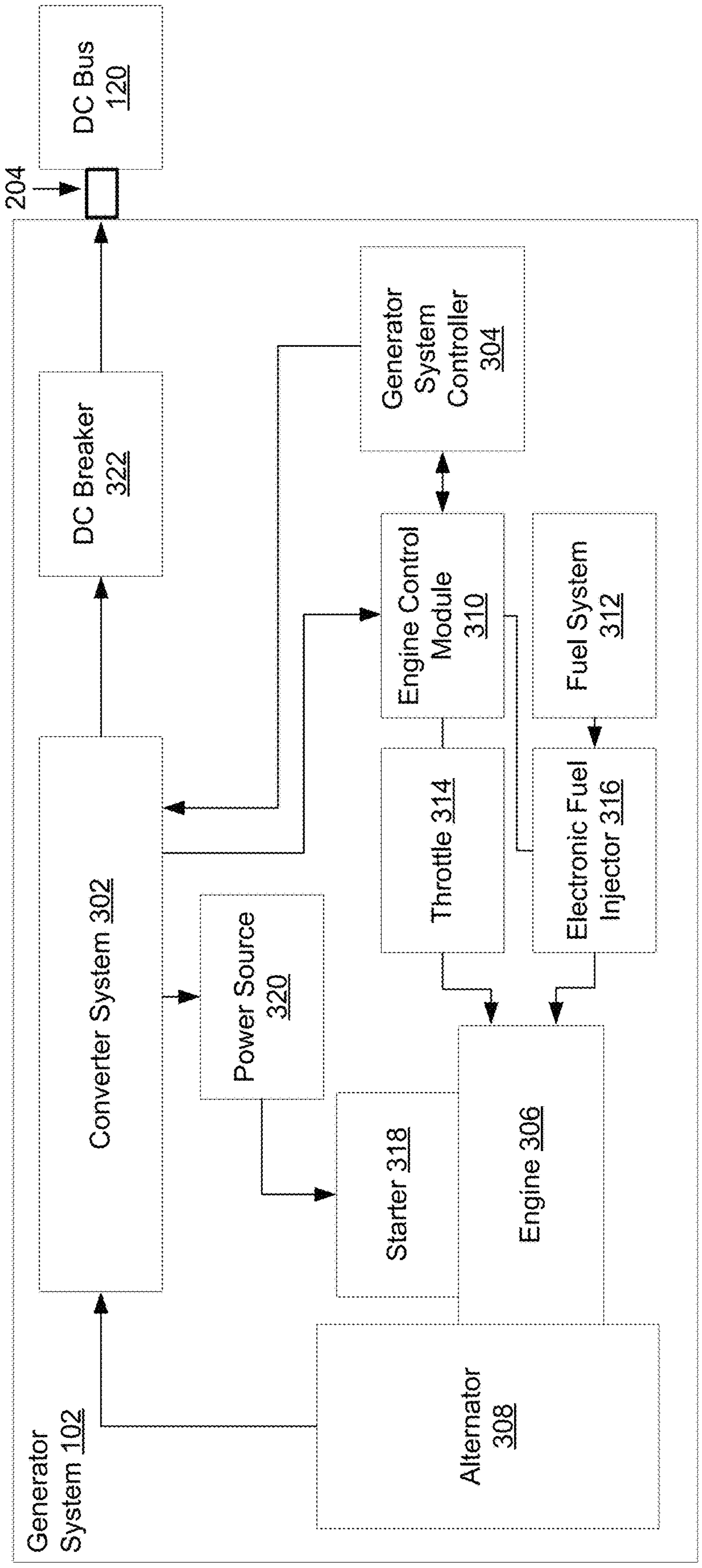
FIG. 4 is a block diagram of a generator system according to examples.

FIG. 4. is a block diagram of a generator 102 according to examples. This example includes the converter system 302, generator system controller 304, engine 36, and alternator 308 shown in FIG. 3. This example also includes engine control module 310, fuel system 312, throttle 314, electronic fuel injector 316, starter 318, power source 320, and DC breaker 322. The connection 204 to DC bus 120 is also shown.

The engine control module 310 may control the engine 306, the starter 318, the throttle 314, the fuel system 312, and the electronic fuel injector 316. The engine control module 310 may receive instructions from the generator system controller 304 about how the engine 306 and/or the other components listed previously should operate. In other examples, the converter system 302 may send the instructions to the engine control module 310. In some examples, the engine control module 310 is a computer.

The fuel system 312 may store fuel to be used by the engine. For example, the fuel system 312 may be a storage tank storing fuel such as diesel, liquid petroleum, or natural gas. The storage tank includes connections for the transfer of fuel to the engine.

The electronic fuel injector 316 may control the delivery of fuel from the fuel system 312 to the engine 306. The engine control module 310 may instruct or otherwise cause the electronic fuel injector 316 to supply the engine with the determined amount of fuel. For example, the electronic fuel injector 316 may supply the amount of fuel to the engine 306 based on the percentage of maximum rated power the engine is desired or otherwise expected to be operating at.

The throttle 314 may manage the power produced by the engine 306 by controlling the amount of air and/or fuel entering the engine 306. The engine control module 310 may control the throttle 314 to control the power output of the engine 306.

The starter 318 may start the operation of the engine 306 for the generator system 102 to operate. In examples, the starter 318 can be automatically operated by the generator system 102 such as when the generator system controller 304 and/or converter system 302 determines that the generator system 102 should produce power because the actual voltage of the DC bus is below the desired voltage of the DC bus. The generator system 102 may also include a button or other activation interface on the generator housing 202 shown in FIG. 2 to allow a user to manually start the engine 306.

The starter 318 is powered by the power source 320. For example, the power source 320 may be a battery that supplies sufficient power for the starter 318 to start the engine 306.

The DC breaker 322 is an automatically operated electrical switch. The DC breaker 322 protects the generator system 102 and/or the systems connected to the generator system 102 by opening and stopping the flow of power in when excess current is present. For example, if there is an overload or a short circuit, the DC breaker 322 may open to stop the flow of electricity. The DC breaker 322 may automatically close when the condition that causes the excess current is removed and/or manually reset such as via a switch on the generator housing 202.

Figure 5:
FIG. 5 is a block diagram of a direct current converter system according to examples.

FIG. 5 is a block diagram of a converter system 302 according to examples. The converter system 302 includes rectifier 402, boost converter system 404, sensor 406, power supply 408, converter system controller 410, powerline communicator 412, and heatsink 414. FIG. 5 also shows the connections of the converter system 302 to the alternator 308, DC breaker 322, and power source 320.

The rectifier 402 is a system that converts AC power to DC power. For example, the rectifier 402 receives AC power from the rectifier 402 and converts the AC power to DC power. Any type of rectifier may be used such as a half-wave rectifier, full-wave rectifier, and a bridge rectifier. The rectifier 402 will be described in further detail herein with respect to FIG. 6.

The boost converter system 404 boosts the voltage of DC power. For example, the boost converter system 404 receives DC power from the rectifier 402 and boosts the voltage of the DC power. Any type of boost converter may be used to boost the voltage of the DC power. The boost converter system will be described in further detail herein with respect to FIG. 6.

The sensor 406 senses the power flow in the converter system 302. For example, the sensor 406 monitors the current and voltage of the AC power supplied by the alternator 308, the current and voltage of the DC power output by the rectifier 402, and the current and voltage of the DC power output by the boost converter system 404 to the DC bus 120. The sensed information may be sent to the converter system controller 410 so that the converter system controller 410 can control the converter system 302.

The converter system controller 410 is a system that controls the converter system 410. For example, the converter system controller 410 controls the operations of the rectifier 402 and the boost converter system 404. In examples, the converter system controller 410 is a computer. The converter system controller 410 may receive information from the sensor 406 to determine whether the converter system 302 is operating as desired or whether the converter system controller 410 should make changes to the operations of the rectifier 402 and/or boost converter system 404. For example, the converter system controller 410 may cause the boost converter system 404 to step the voltage up higher or lower than the boost converter system 404 is currently stepping up the voltage. In examples, the desired operation of the converter system is based on the desired voltage and actual voltage of the DC bus 120.

The converter system controller 410 may receive operating parameters such as the desired voltage of the DC bus 120, the desired voltage the boost converter system 404 should output, and so on via a powerline communication received by the powerline communicator 412. The powerline communicator 412 may receive communications sent through a conductor such as a powerline from a system connected to the converter system 302. The system may be connected to the converter system 302 via the connection 204.

The power supply 408 is a system that supplies power. For example, the power supply 408 may be a battery that can charge the power source 320 and/or supply power to the components of the converter system 302, such as the converter system controller 410. In some examples, the power supply 408 may supply power to any component of the generator system 102 that requires power. Therefore, the generator may operate without requiring power from an outside source using the power supply 408.

The heatsink 414 may transfer heat from the converter system 302. For example, the operation of the rectifier 402 and the boost converter system 404 may produce heat. The heatsink 414 may transfer the heat from the converter system 302 to ensure reliable operation of the converter system 302. Any heat sink may be used, such as active heatsinks, passive heatsinks, convective cooling systems, pumped liquid heatsinks, fin heatsinks, and so on.

Figure 6:
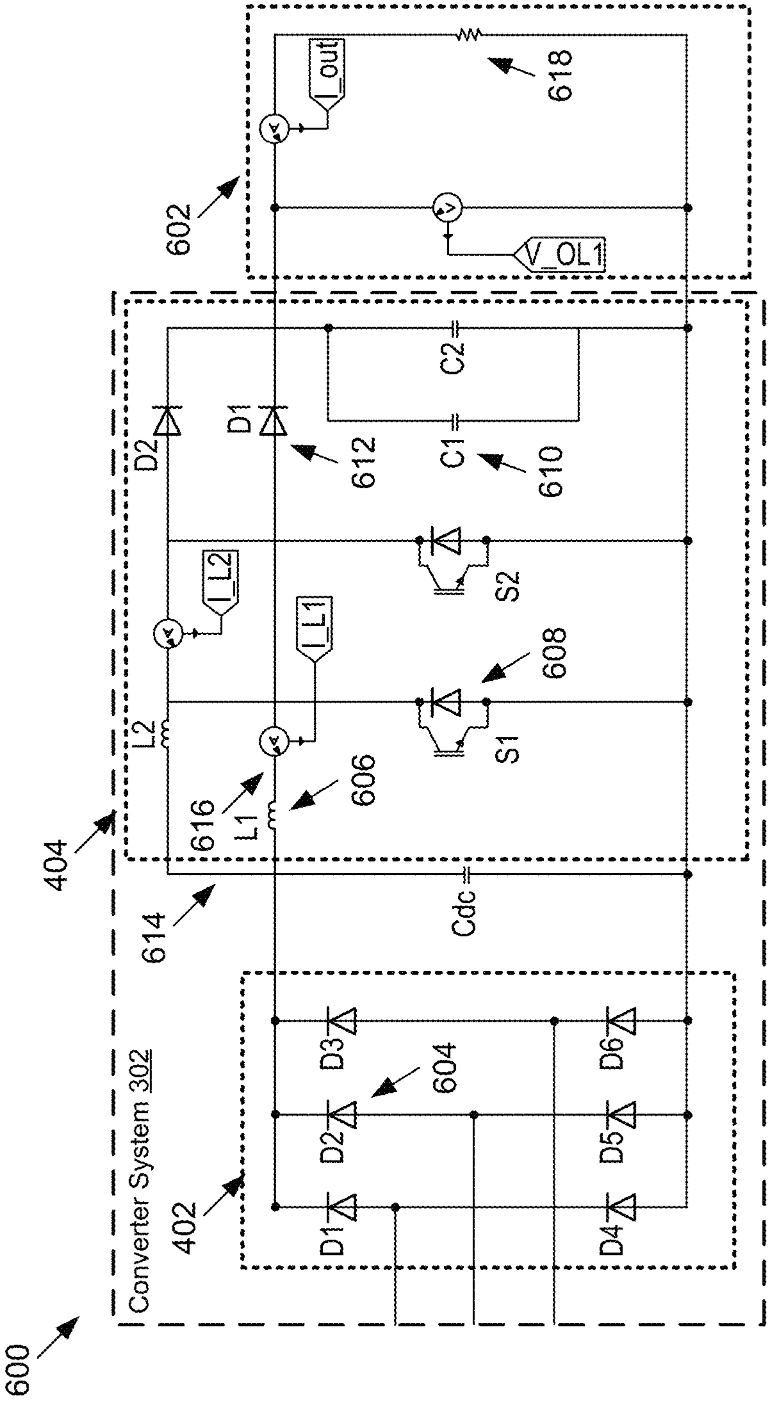
FIG. 6 is a circuit diagram of a generator system according to examples.

FIG. 6 is a circuit diagram of a generator system 102 according to examples. This example includes the circuit diagrams of the rectifier 402, boost converter system 404, and a load 602. The rectifier 402 receives AC power and produces DC power. The example illustrates the rectifier 402 with wires to receive electricity produced by the alternator 308. The rectifier 402 has three wires to receive electricity because the alternator 308 in this example is a three-phase alternator that produces three currents. However, any type of alternator 308 and rectifier 402 may be used. The three currents are added together to produce the total AC power output. Each phase is received via one of the wires connected to the rectifier 402. The rectifier 402 includes six diodes, including diode 604. The diodes allow the AC power received to only flow in one direction, resulting in DC power being supplied to the boost converter system 404. The converter system controller 410 may control the components of the rectifier 402 to cause the rectifier 402 to produce DC power with a desired current and/or voltage.

The boost converter system 404 includes inductors such as inductor 606, transistors such as transistor 608, capacitors such as capacitor 610, and diodes such as diode 612. The converter system in this example is an interleaved boost converter because of the split paths, path 614 and path 616. The split paths reduce conduction losses and increase the efficiency of the boost converter system 404. However, any type of boost converter system may be used. The inductors, such as inductor 606, resist changes in current that occur when power is received from the rectifier 402 and when the transistors, such as transistor 608, are in an on state. The resistance due to the change in current causes an increase in the energy stored in the magnetic field of each inductor. When the transistors are in an off state, current is reduced or stepped down and impedance in the circuit is raised, resulting in the voltage stepping up and charging the capacitors such as capacitor 610. The transistors cycle between on and off states to step up the voltage of the power supplied to the load 602. The diodes, such as diode 612 prevents the capacitor from discharging through the transistors when they are in an on state. The power with the stepped up voltage is supplied to the load 602. The converter system controller 410 may control the components of the boost converter system 404 to cause the boost converter system 404 to produce DC power with a desired current and/or voltage.

The load 602 includes a resistor 618 to illustrate the load receiving power from the converter system 302. The load 602 may be any system connected to the DC bus 120 that receives power.

Figure 7:
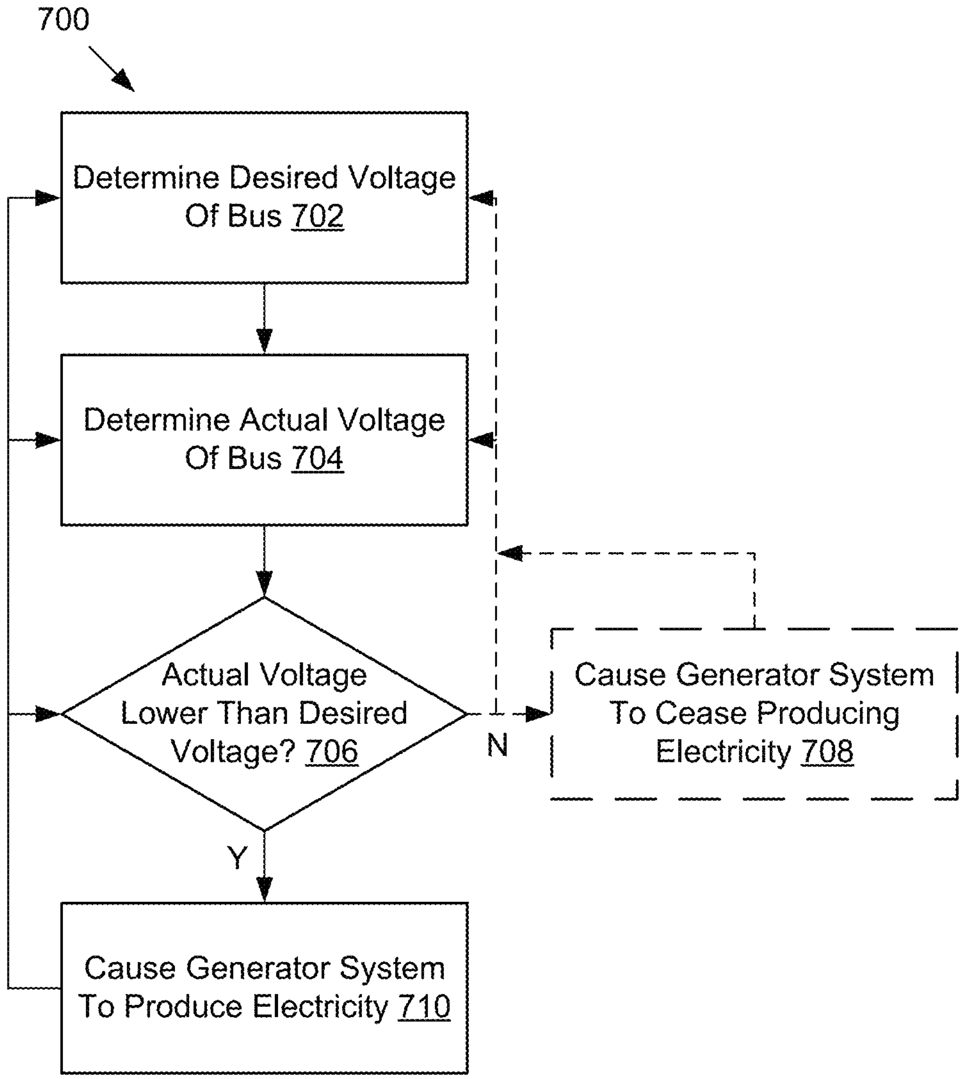
FIG. 7 is a flow chart illustrating a method of operating a generator according to examples.

FIG. 7 is a flow chart illustrating a method 700 of operating a generator according to examples. Method 700 includes operations 702, 704, 706, 708, and 710. Beginning in operation 702, the desired voltage of a bus is determined. For example, the generator system controller 304 and/or the converter system controller 410 may determine the desired voltage of the DC bus 120. In some examples, the desired voltage is stored in the generator system controller 304 and/or the converter system controller 410. In other examples, the desired voltage is received such as via powerline communication. The powerline communicator 412 may receive the powerline communication that includes the desired voltage. The desired voltage may then be stored in the generator system controller 304 and/or the converter system controller 410.

Once the desired voltage is determined, the actual voltage of the bus is determined in operation 704. For example, the generator system 102 determines the actual voltage of the DC bus 120. The actual voltage may be determined via the connection 204 to the DC bus 120. The sensor 406, converter system controller 410, and/or the generator system controller 304 may determine the actual voltage.

Flow proceeds to operation 706, and it is determined whether the actual voltage is lower than the desired voltage. For example, the generator system controller 304 and/or the converter system controller 410 determines whether the actual voltage of the DC bus 120 is lower than the desired voltage of the DC bus 120. In some examples, it may be determined whether the actual voltage is within a threshold range to determine whether flow should proceed to operation 708 or operation 710.

If the actual voltage is not lower than the desired voltage, flow may optionally proceed to operation 708. In operation 708, the generator system is caused to cease producing electricity. For example, the generator system controller 304 causes the generator system 102 to stop producing electricity. In some examples, the generator system controller 304 causes the generator system to produce a percentage of the rated power of the generator system 102 to keep the actual voltage at or within the threshold range of the desired voltage. In examples where it is determined whether the actual voltage is within a threshold range, flow optionally proceeds to operation 708 to cease and/or adjust the percentage of rated power the generator system 102 produces.

In some examples, if the actual voltage is not lower than the desired voltage, flow may proceed to operation 702 or operation 704. This allows the method to continuously check that the actual voltage does not drop below the actual voltage.

If the actual voltage is lower than the desired voltage, flow proceeds to operation 710. In operation 710, the generator system is caused to produce electricity. For example, the generator system controller 304 causes the generator system 102 to produce electricity. In some examples, the generator system controller 304 causes the generator system 102 to produce the maximum rated power based on a magnitude of the difference between the actual voltage and the desired voltage. In other examples, the generator system controller 304 causes the generator system 102 to produce a percentage of the maximum rated power based on a magnitude of the difference between the actual voltage and the desired voltage.

Flow may then proceed to operation 702, 704, or 706 for the method to continuously determine whether the actual voltage is lower than the desired voltage to avoid unnecessarily using the generator and/or letting the actual voltage drop below the desired voltage.

Figure 8:
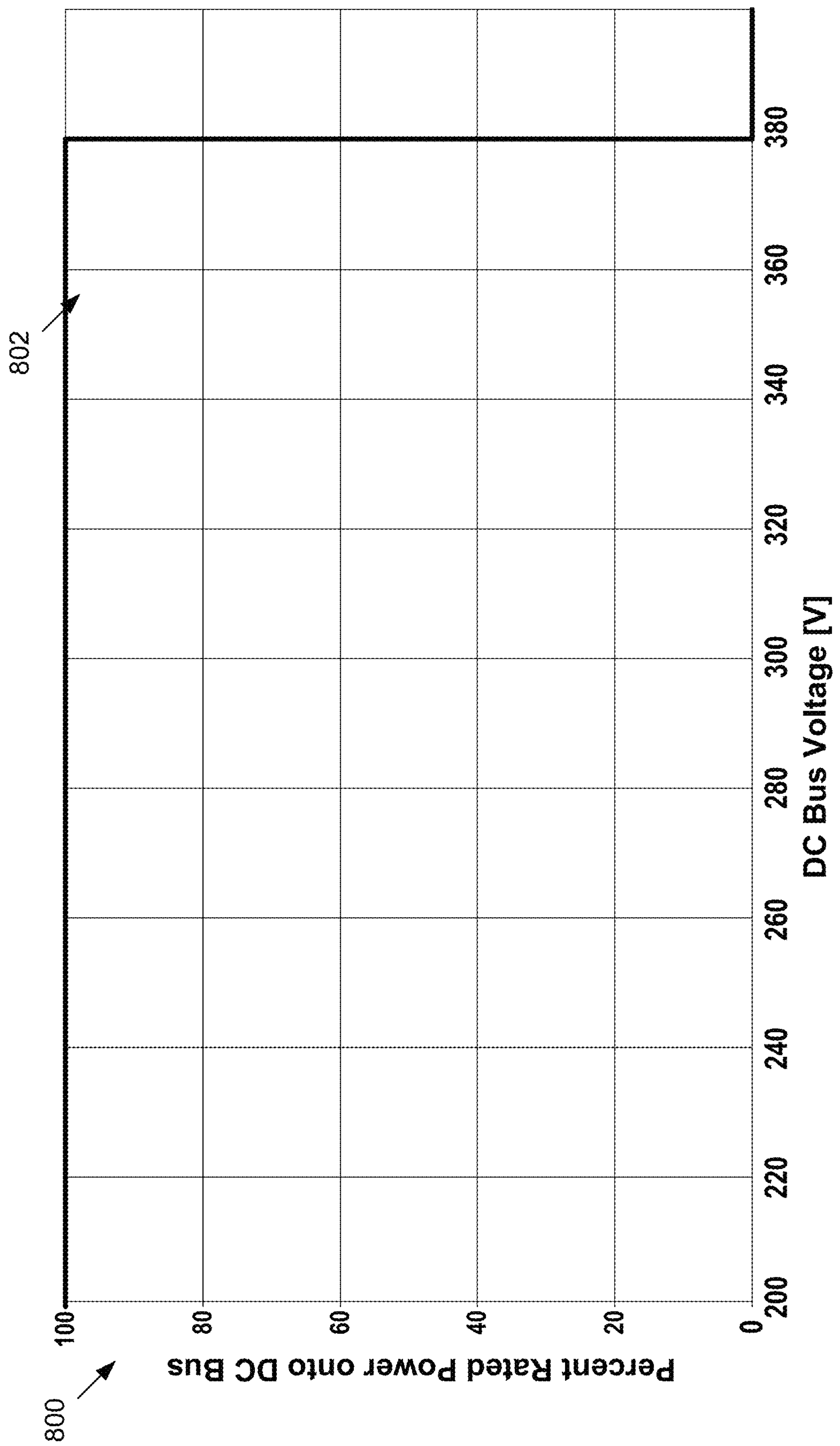
FIG. 8 is a chart illustrating the operation of a generator according to examples.

FIG. 8 is a chart 800 illustrating the operation of a generator according to examples. The chart illustrates the percentage of rated power that the generator uses to produce electricity to be supplied to the bus. For example, when the DC bus 120 has an actual voltage of 300 V, the generator system 102 has a maximum (one hundred percent) rated power that is used to produce electricity to be supplied to the DC bus 120. When the actual voltage of the DC bus 120 is 380 V, the generator system 102 has a zero percentage rated power and does not produce electricity. The desired voltage 802 of the DC bus 120 is 380 V in this example. If the DC bus 120 has an actual voltage of 380 V or higher, the generator system 102 does not produce electricity.

Figure 9:
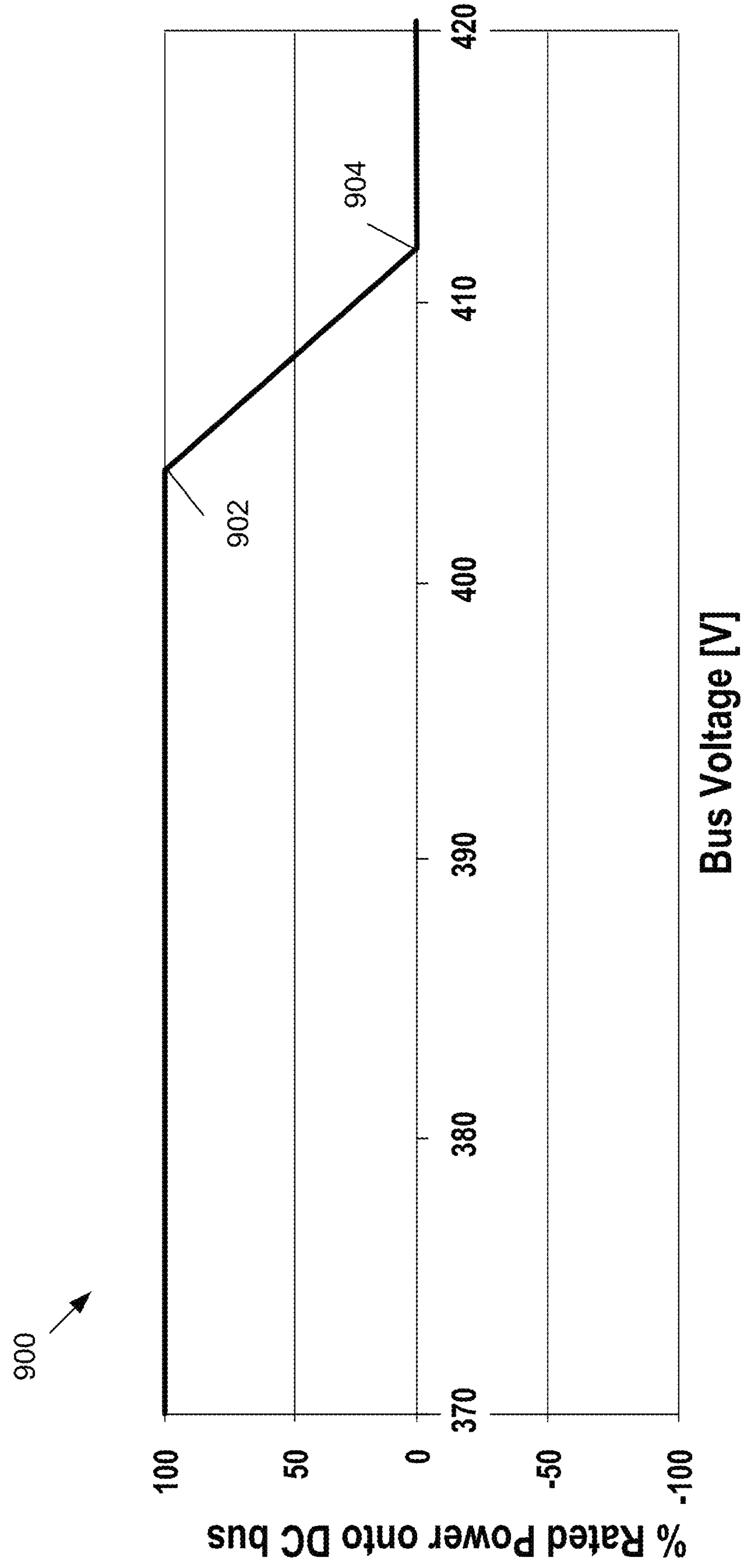
FIG. 9 is a chart illustrating the operation of a generator according to examples.

FIG. 9 is a chart 900 illustrating the operation of a generator according to examples. The chart illustrates the percentage of rated power that the generator uses to produce electricity to be supplied to the bus. The chart illustrates that the desired voltage 904 of the DC bus 120 is 412 V in this example. The threshold range is 8 V in this example, and the threshold range point 902 is therefore 404 V. Thus, the generator system 102 generates a percentage less than maximum of the rated power when the DC bus 120 has an actual voltage between 404 V and 412 V. When the actual voltage of the DC bus 120 is less than the threshold range point 902, the generator system 102 generates the maximum rated power. When the actual voltage of the DC bus 120 is greater than the desired voltage 904, the generator system 102 produces no power. The chart 900 illustrates a positive linear relationship between the percentage or rated power the generator system 102 operates at and the actual voltage of the DC bus 120.

Referring to the above process generally, it is noted that certain aspects may be performed in different orders. Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The example embodiments described herein may be implemented using hardware, software, or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more memory cards (e.g., flash memory) for program and data storage, and a random access memory, for temporary data and program instruction storage. From a software standpoint, a CPU typically includes software resident on a storage media (e.g., a memory card), which, when executed, directs the CPU in performing transmission and reception functions. The CPU software may run on an operating system stored on the storage media, such as, for example, UNIX or Windows, iOS, Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments have been described above, it should be understood that they have been presented by way of example, and not limitation. It will be apparent to persons skilled in the relevant art(s) that various changes in form and detail can be made therein. Thus, the present invention should not be limited by any of the above-described example embodiments but should be defined only in accordance with the following claims and their equivalents.

What is claimed is:

1. A method for operating a generator system, the method comprising:

monitoring, by a generator system controller, a microgrid to manage power quality of the microgrid, wherein the microgrid comprises one or more intermittent generation sources and a generator system connected via a direct current bus, wherein operation of the one or more intermittent generation sources affects an actual voltage of the direct current bus, and wherein the monitoring includes monitoring the actual voltage of the direct current bus;

determining, by the generator system controller, the actual voltage of the direct current bus is lower than a desired voltage of the direct current bus; and in response to determining the actual voltage is lower than the desired voltage, causing, by the generator system controller, the generator system to operate at a percentage below maximum rated power to increase the actual voltage to the desired voltage or within a threshold of the desired voltage.

2. The method of claim 1, further comprising, as the actual voltage increases, linearly reducing the percentage below the maximum rated power.

3. The method of claim 1, further comprising:

determining a battery level of a battery connected to the direct current bus is below a threshold level; and causing the generator system to operate to charge the battery.

4. The method of claim 1, further comprising:

when the actual voltage is equal to the desired voltage or within the threshold of the desired voltage, determining a second percentage below the maximum rated power to keep the actual voltage equal to the desired voltage or within the threshold of the desired voltage; and causing the generator system to operate at the second percentage below the maximum rated power.

5. The method of claim 1, further comprising:

determining a voltage level of a system the generator system is connected to via the direct current bus is below a threshold level; and causing the generator system to operate to raise the voltage level of the system.

6. The method of claim 1, wherein the percentage below the maximum rated power is based on a magnitude of difference between the actual voltage and the desired voltage.

7. The method of claim 1, further comprising adjusting the percentage below the maximum rated power the generator system operates at based on a change in a magnitude of difference between the actual voltage and the desired voltage.

8. A generator system comprising:

an engine operable to generate mechanical energy;

an alternator operable to convert the mechanical energy generated by the engine to alternating current electricity;

a converter system operable to convert alternating current electricity to direct current electricity; and a generator system controller operable to control the generator system based on an actual voltage of a direct current bus and a desired voltage of the direct current bus to manage power quality of a microgrid, wherein the microgrid comprises one or more intermittent generation sources connected to the microgrid via the direct current bus, wherein operation of the one or more intermittent generation sources affects the actual voltage of the direct current bus, and wherein the generator system controller controlling the generator system includes to:

monitor the actual voltage;

determine the actual voltage is lower than the desired voltage, and in response to determining the actual voltage is lower than the desired voltage, cause the generator system to operate at a percentage below maximum rated power to increase the actual voltage to the desired voltage or within a threshold of the desired voltage.

9. The generator system of claim 8, the generator system controller further operable to, as the actual voltage increases, linearly reduce the percentage below the maximum rated power.

10. The generator system of claim 8, the generator system controller further operable to:

determine a battery level of a battery connected to the direct current bus is below a threshold level; and cause the generator system to operate to charge the battery.

11. The generator system of claim 8, further comprising an engine control module operable to control the operation of the engine based on instructions from the generator system controller.

12. The generator system of claim 11, further comprising a throttle operable to manage power produced by the engine, wherein the engine control module is operable to control the throttle.

13. The generator system of claim 11, further comprising an electronic fuel injector operable to control delivery of fuel to the engine, wherein the engine control module is operable to control the electronic fuel injector.

14. The generator system of claim 8, wherein the converter system comprises:

a rectifier operable to convert alternating current electricity to direct current electricity;

a boost converter system operable to boost a voltage of direct current electricity;

a sensor operable to sense power flow in the converter system; and a converter system controller operable to control the converter system.

15. The generator system of claim 14, wherein the converter system controller is operable to receive information from the sensor and control the converter system based at least in part on the information.

16. The generator system of claim 14, wherein the converter system controller is operable to control the converter system based at least in part on the desired voltage.

17. The generator system of claim 14, wherein the boost converter system comprises an interleaved boost converter.

18. A direct current microgrid system comprising:

a direct current bus operable to conduct electricity;

one or more intermittent generation sources, wherein operation of the one or more intermittent generation sources affect an actual voltage of the direct current bus; and a generator system, comprising:

an engine operable to generate mechanical energy;

an alternator operable to convert the mechanical energy generated by the engine to alternating current electricity;

a converter system operable to convert alternating current electricity to direct current electricity; and a generator system controller operable to control the generator system based on the actual voltage of the direct current bus and a desired voltage of the direct current bus to:

monitor the actual voltage;

determine the actual voltage is lower than the desired voltage, and in response to determining the actual voltage is lower than the desired voltage, cause the generator system to operate at a percentage below maximum rated power to increase the actual voltage to the desired voltage or within a threshold of the desired voltage.

19. The direct current microgrid system of claim 18, wherein the direct current bus comprises a first conductor rail and a second conductor rail.

20. The direct current microgrid system of claim 19, wherein:

the first conductor rail is a positive voltage rail; and the second conductor rail is a negative voltage rail.

21. The direct current microgrid system of claim 18, the direct current microgrid system further comprising any one of (i) a solar panel system, (ii) a wind turbine, (iii) a water turbine, or (iv) any combination of (i)-(iii).

22. The direct current microgrid system of claim 18, the generator system controller further operable to, as the actual voltage increases, linearly reduce the percentage below the maximum rated power.

* * * * *